United States Patent [19]

Brouwer et al.

[11] 4,136,962
[45] Jan. 30, 1979

[54] APPARATUS FOR ORIENTING AND MAINTAINING THE ORIENTATION OF CONSTRUCTION EQUIPMENT

[75] Inventors: Floyd Brouwer, Jenison; Roger E. Helms, Sand Lake; Fred D. Litty; Merlin J. Applegate, both of Grand Rapids, all of Mich.

[73] Assignee: Vari-Tech Company, Grand Rapids, Mich.

[21] Appl. No.: 760,378

[22] Filed: Jan. 18, 1977

[51] Int. Cl.$^2$ .................... G02B 27/00; G01C 9/00
[52] U.S. Cl. ...................................... 356/248; 350/16; 356/148
[58] Field of Search ............... 356/148, 153, 248, 249; 350/16

[56] References Cited
U.S. PATENT DOCUMENTS

| | | | |
|---|---|---|---|
| 2,252,727 | 8/1941 | Pepper | 250/224 UX |
| 2,789,260 | 4/1957 | Curtis et al. | 250/233 X |
| 3,096,591 | 7/1963 | Higgins, Jr. et al. | 33/366 |
| 3,171,213 | 3/1965 | Swarts et al. | 33/377 X |
| 3,876,309 | 4/1975 | Zicaro et al. | 356/248 X |
| 3,936,197 | 2/1976 | Aldrink et al. | 356/250 |
| 4,062,634 | 12/1977 | Rando et al. | 356/248 |

Primary Examiner—Paul A. Sacher
Assistant Examiner—Matthew W. Koren
Attorney, Agent, or Firm—McGarry & Waters

[57] ABSTRACT

An apparatus for orienting and maintaining the orientation of laser and similar construction equipment in a predetermined orientation with respect to a horizontal plane comprises superimposed first, second and third support plates, each of which is preferably annularly shaped for positioning a laser beam generator therethrough. The third support plate is mounted to and between the first and second support plates for pivotable movement about mutually perpendicular first and second axes, respectively. The first or top plate has level vials mounted perpendicular to the first and second axes for detecting the position of the first plate with respect to a horizontal plane. A pair of threaded screws are threaded into the central third plate to adjust the position of the first plate with respect to the bottom or second plate about the two mutually perpendicular axes. The position of the two level vials is detected through a capacitance sensing circuit which determines the direction of rotation, if any, of each of the level vials about the axis to which such vial is perpendicular and the degree of rotation of the level vial from a given orientation with respect to a horizontal plane. A servo mechanism is coupled to each capacitive sensing circuit to drive a respective threaded rod to null the output signal therefrom so as to establish and maintain the first plate in a predetermined orientation with respect to the horizontal plane. The servo mechanism drives the threaded rods at speeds which are proportional to the degree of rotation of the respective level vial so as to minimize hunting of the servo about the null point.

15 Claims, 8 Drawing Figures

APPARATUS FOR ORIENTING AND MAINTAINING THE ORIENTATION OF CONSTRUCTION EQUIPMENT

BACKGROUND OF THE INVENTION

Field of the Invention

This invention relates to apparatus for establishing and maintaining a support at a predetermined orientation with respect to a horizontal plane. In one of its aspects, the invention relates to a device for leveling construction tools such as laser equipment.

Background of the Invention

In U.S. Pat. No. 3,588,249 to Studebaker, issued June 28, 1971, there is disclosed a laser beam survey apparatus for rotating a laser beam about a given plane. A laser generating apparatus is vertically supported on a tripod and a pentaprism reflects the laser beam at an angle of 90°. The pentaprism is rotated about the axis of the incident laser beam so that the reflected beam is swept in a plane 360° about the incident laser beam. This laser beam has been used for guiding construction equipment many feet from the laser generating apparatus as well as indoors for aligning ceilings and the like.

The Studebaker apparatus has conventional adjusting means to adjust the position of the laser generating apparatus with respect to the vertical so as to provide a horizontal plane or a plane having an angle with respect to the horizontal. It has been discovered that in the use of this type of equipment out of doors, the device does not maintain a level condition due to changing sun, wind and other environmental conditions. A slight change in the orientation of the plane can cause a great and unacceptable difference at a distance at which the plane is detected.

In U.S. Pat. No. 3,462,845 to Matthews, issued Aug. 26, 1969, there is disclosed and claimed an apparatus for maintaining an elevation wherein a laser beam is rotated about a vertical axis and means are provided for automatically maintaining the beam in a horizontal condition. The laser generating apparatus is mounted in a gimbaled mount which includes a pendulous weight which maintains the resulting laser beam in a horizontal plane.

Apparatus for automatically adjusting laser generators to a predetermined orientation in a given plane are well known and disclosed in the U.S. patents to Zicaro et al., U.S. Pat. No. 3,876,309, issued Apr. 8, 1975, and to Cindrich et al., U.S. Pat. No. 3,856,409, issued Dec. 24, 1974. Neither of these systems relates to maintaining a rotating laser beam in a level or predetermined orientation.

Optical apparatus for maintaining construction sighting devices in a level condition are disclosed in the United States patents to Tsuda et al., U.S. Pat. No. 3,663,111, issued May 16, 1972, and Leister et al., U.S. Pat. No. 2,350,240, issued May 30, 1944. The Tsuda et al. device utilizes a pendulously hung optical device wherein a telescope is automatically leveled. The Leister et al. device utilizes a plurality of electrically responsive levels to maintain a sextant in a level condition.

The U.S. Pat. No. to Pepper, 2,252,727, issued Aug. 19, 1941, discloses a leveling device wherein a bubble level is used to detect the level condition of a support and a servo system is provided for leveling the support to null the output signal from the detecting means. A leveling device which utilizes radio frequency to detect the capacitance across a level vial is disclosed in the U.S. Pat. No. 3,096,591 to Higgins, Jr. et al., issued July 9, 1973.

The patent to Swarts et al., U.S. Pat. No. 3,171,213, discloses an electrolytic tilt sensor wherein the horizontal orientation of a gimbaled platform is detected by a liquid level sensing device and the platform is driven to maintain a zero tilt angle with respect to one of the axes.

U.S. Pat. No. to Inoue, 3,604,119, discloses an automatic surveying apparatus wherein a platform is maintained in a predetermined orientation by detecting the orientation of a toroidally shaped vessel.

SUMMARY OF THE INVENTION

According to the invention, there is provided an apparatus for orienting and maintaining laser equipment and the like in a predetermined relationship with respect to the horizontal about two mutually perpendicular axes. The apparatus automatically levels a first support means and maintains the first support means in a level condition, or in any predetermined orientation with respect to a horizontal plane.

The apparatus comprises a first support means to which a laser or other construction equipment can be mounted; a second support means in underlying relationship to the first support means and adapted to be mounted in a fixed position to a tripod or like support; and a third support means gimbaled in position between the first and second support means. Means mount the third support means to the first and second support means for rotation about mutually perpendicular first and second axes respectively. Means mounted on the first support means detect the position of the first support means with respect to a horizontal plane and generate an output signal representative thereof. Servo means are electrically coupled to the detecting means and are mounted on a third support means for driving the first support means about the first and second axes with respect to the second support means responsive to the output signal from the detecting means so as to null the output signal from the detecting means.

In a preferred embodiment of the invention, the first, second and third support means have a relatively large central opening so that a laser beam can be mounted to the first support means and extend through the first, second and third support means.

The position detecting means can be any suitable means which detect the position of the first support means with respect to a horizontal plane. Desirably, such detecting means include a first level vial mounted on the underside of the first support means perpendicular to the first axis and a second level vial mounted on the underside of the first support means perpendicular to the second axis. A capacitance detecting circuit is coupled to each of the level vials for detecting the rotational position of the vial — both as to direction as well as the angular degree of movement. Each of the circuits generates a control signal representative of the degree and direction of rotational position of the first vial with respect to the horizontal plane.

The servo means can be any suitable means for driving the first support means with respect to the second support means about the first axis and for driving the third support means with respect to the second support means about the second axis so as to null the output signals from the detecting means. In a preferred embodiment, the servo means includes a drive means for driving the first support means about the first and second axes and circuit means coupled to the detecting means for driving the drive means at a speed proportional to the degree of deviation of the first support means from the horizontal plane about the first and second axes. At lower deviation angles, the drive means is pulsed to drive the drive means slowly so as to avoid hunting of the servo means about the null point. In the preferred embodiment of the invention, a slow pulsing rate is used when the deviation of the first support from horizontal about a given axis is slight, a second pulsing speed is used when the deviation of the axis from horizontal is somewhat greater and a continuous drive is provided when the deviation of the first support about a given axis is above a predetermined minimum.

The drive means can be any suitable device for driving the supports with respect to each other. A suitable driving means includes a threaded rod threaded into engagement with the third support means and extending into abutting relationship with the second support means for driving the third support means about the second axis with respect to the second support means. A threaded rod threaded into the third support means and extending to the first support means is desirably provided for driving the first support means about the first axis with respect to the third support means. Motors, preferably mounted on the third support means, are provided for driving the threaded rod.

The circuitry for the detecting means and the servo means is desirably mounted in printed circuit form on the third support means. Connections are provided between the printed circuitry and the level sensing vials which are mounted to the first support means for coupling the vials to the detecting circuits.

In a preferred embodiment of the invention, a laser generating tube is mounted to the first support means and extends through the first, second and third support means. A fourth support means, for example, a tripod mount, mounts the third support means so that the first support means establishes and maintains the laser beam in a predetermined orientation with respect to a horizontal plane.

BRIEF DESCRIPTION OF THE DRAWINGS

The invention will now be described with reference to the accompanying drawings in which.

DETAILED DESCRIPTION OF THE PREFERRED EMBODIMENT

Figure 1:
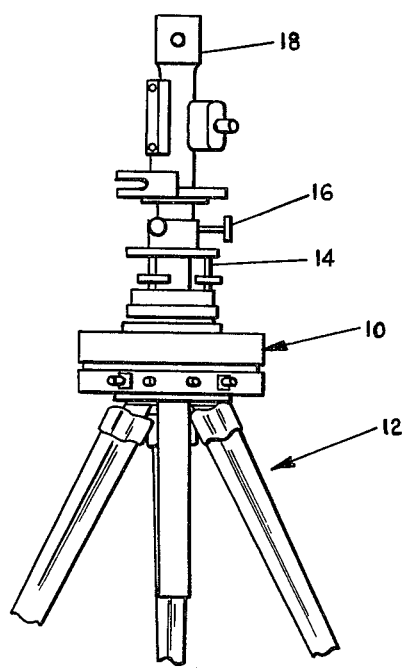
FIG. 1 is a side elevational view of a leveling platform according to the invention mounted on a tripod and a laser with a rotating head mounted on the platform.

Referring now to the drawings and to FIG. 1 in particular, there is shown a self-leveling platform 10 mounted upon a conventional tripod 12. A laser generator 14 extends through the center of the platform 10 and is mounted thereto through a mounting mechanism 16. A rotating head 18 is mounted on top of the laser generator 14 to reflect the beam through a 90° angle and to rotate the reflected beam around a 360° axis extending through the center of the laser beam. The rotating head mechanisms and the laser generators are well known and per se form no part of this invention.

Figure 2:
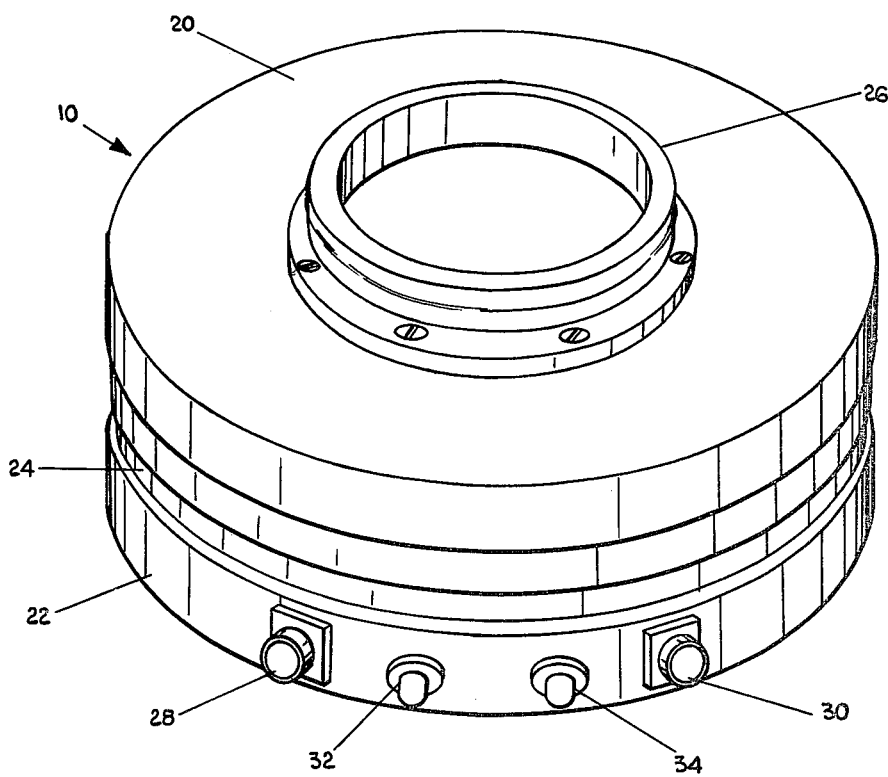
FIG. 2 is an enlarged perspective view of a platform according to the invention.

Referring now to FIG. 2, the self-leveling platform has a first top plate 20, a second bottom plate 22 and a flexible sleeve 24 positioned between the two. The laser generating apparatus 14 can be mounted to the top plate 20 through ring 26 mounted to the top of the top plate 20 or through suitable threaded openings (not shown) in the top plate 20. A laser power plug 28 is provided in the bottom plate 22 to supply power to the laser generator. Power plug 30 provides an inlet for supplying power to the laser power plug as well as to the self-leveling platform. An off-level warning light 32 is provided to indicate when the device is not level as, for example, when the leveling mechanism within the platform is at the limits of adjustment without leveling the platform. Further, a power light 34 is provided in the bottom plate 22 to indicate whether the power to the unit is on or off. The bottom plate is adapted to be mounted to the tripod 12 through conventional fasteners (not shown).

Figure 3:
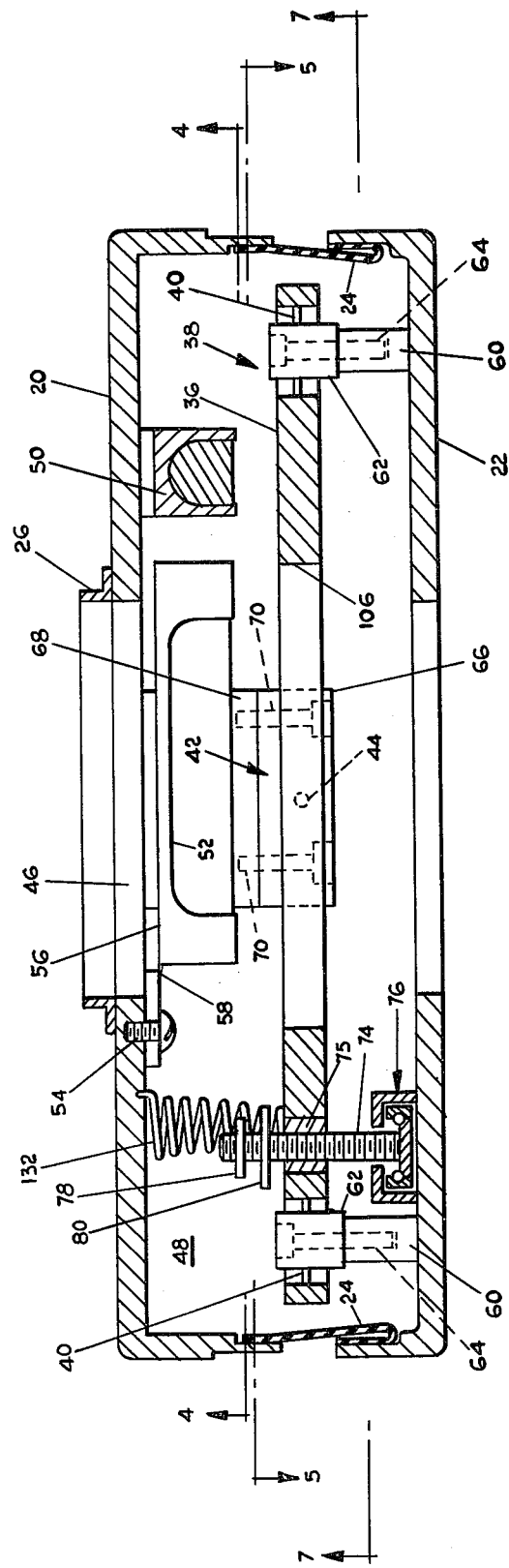
FIG. 3 is a side elevational view in section of a platform according to the invention.

Referring now to FIG. 3, a gimbaled central plate 36 is mounted between the top plate 20 and the bottom plate 22. A pivot mounting means 38 and pivot pins 40 provide for pivotable mounting of the gimbaled plate 36 with respect to the bottom plate 22 about pivot pins 40. In like manner, a pivot mounting means 42 supports the top plate 20 for pivotable movement about pivot pins 44 (see FIG. 5).

The top plate 20 is a casting having a central opening 46 and a hollow interior 48. A first level vial 50 is mounted to the undersurface of the top plate 20 perpendicular to the pivot axis 40 of the gimbaled central plate 36. Further, the first level vial 50 is generally centered with respect to the axis of the pivot pins 40 so as to detect the condition of the top plate 20 (and gimbaled plate 36) with respect to a horizontal plane passing through the axis of pivot pins 40.

In like manner, the second level vial 52 is mounted to the underside of the plate 20 and is generally centered with respect to the axis of pivot pins 44 so as to detect the condition of the top plate 20 with respect to the horizontal plane passing through the axis of pivot pins 44. Thus, the level vials 50 and 52 are mutually perpendicular to each other.

Each level vial is mounted in the same fashion for planar adjustment with respect to the top plate 20. The mounting of the level vial 52 to the top plate 20 will be described. It is to be understood, however, that the mounting of level vial 50 to the top plates 20 is identical.

Figure 4:
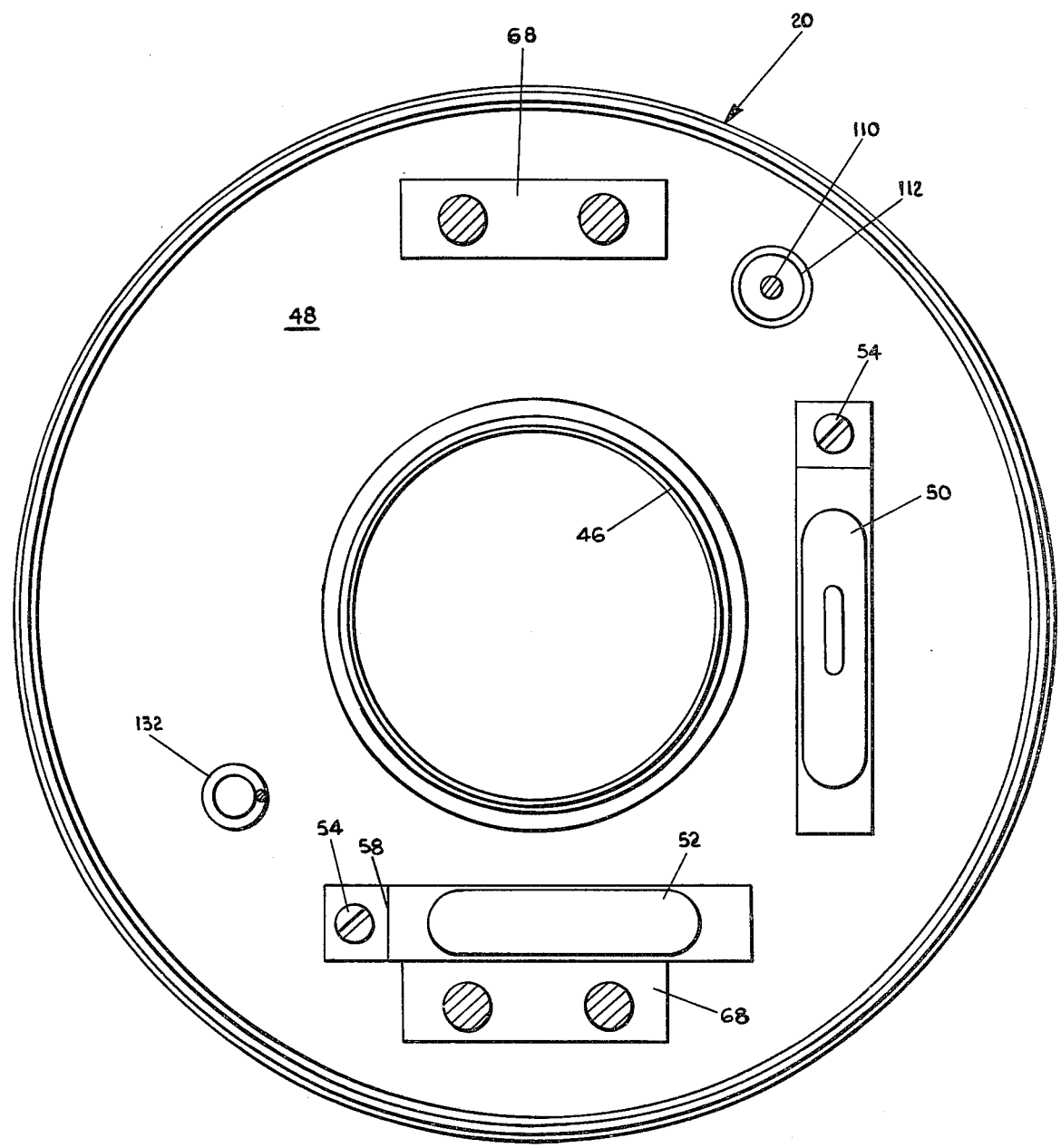
FIG. 4 is a view taken along lines 4—4 of FIG. 3.

Referring to FIGS. 3 and 4, the level vial 52 is mounted at an end portion to the top plate through fastener 54. A step portion 56 is provided beneath the center of the level vial and joins the end portion through a narrow bridge 58. Thus, as seen in FIG. 3, a small space is left between the center of the level vial 52 and the undersurface of the top plate 20. Adjustment of the level vial 52 with respect to the top plate 20 is made by permanently forcing the level vial toward or away from the top plate 20 such that the central portion of the level vial rotates about an axis through the narrow bridge 58. In this manner, the angular position of the level vial 52 and 50 can be adjusted with respect to the undersurface of the plate 20. The bridge is sufficiently strong so as to rigidly retain the level vial in its adjusted position after the adjustment has been made.

Figure 5:
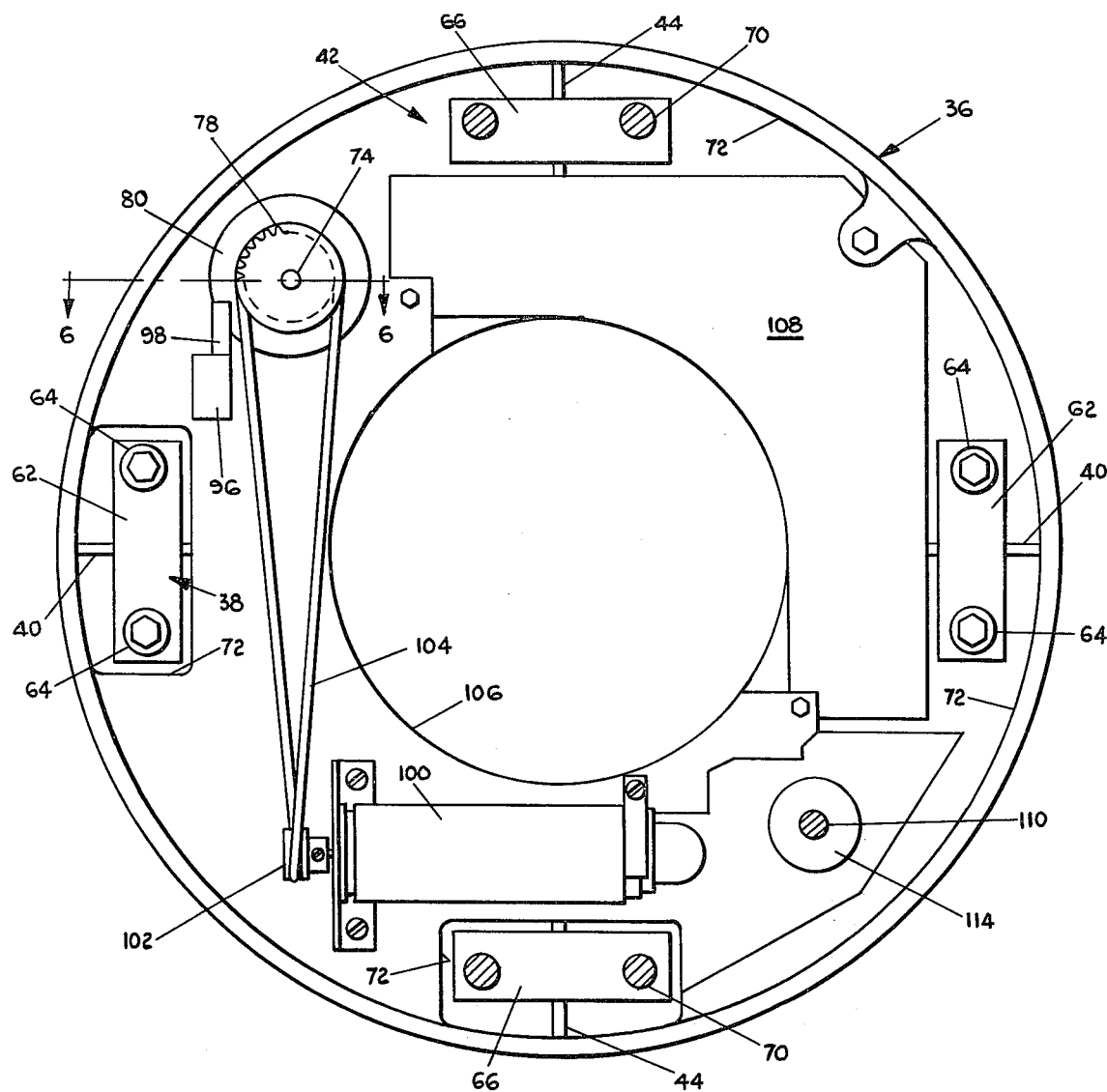
FIG. 5 is a view taken along lines 5—5 of FIG. 3.

Referring now to FIGS. 3 and 5, the pivot means 38 comprises a block 62 and a block 60 which are secured together through threaded fastener 64. Block 60 can be cast directly into the bottom plate 22 or can be otherwise secured to the bottom plate 22 through other means. The blocks 62 fit into openings 72 in the control plate 36 and are pivotably mounted thereto through pivot pins 40.

Referring now to FIGS. 3, 4 and 5, the pivot mounting means 42 comprises a block 66 and a block 68 secured together through threaded fastener 70. Block 68 can be cast into the top plate 20 or otherwise secured to top plate 20 through conventional means. The blocks 66 fit into openings 72 in the central plate 36 and are secured thereto through pivot pins 44. Desirably, the pivot pins 44 are pivotably mounted in the block 68 through rubber bushed bearings (not shown) which spring load the block 68 in a given position with respect to the plate 36. In like manner, the pins 40 are desirably mounted to the block 62 through rubber bushed bearings (not shown) to spring load the block 62 with respect to the center plate 36.

Figure 6:
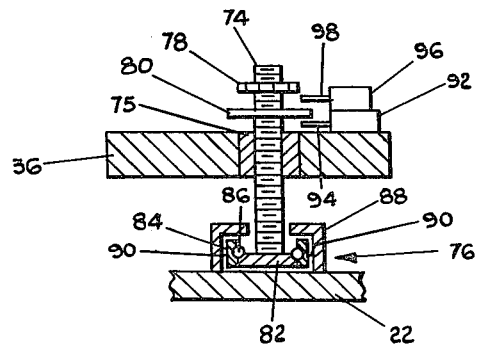
FIG. 6 is a view taken along lines 6—6 of FIG. 5.

The rotational position of the plate 36 with respect to the bottom plate 22 about the pivot pins 40 is determined by a motor driven threaded rod assembly which will now be described with reference to FIGS. 3, 5 and 6. A threaded rod 74 is threaded into a nut 75 in plate 36. The rod extends through the nut and mounts a gear wheel 78 and an annular plate 80. A pivotable bearing journal 76 mounts the bottom portion of the rod 74 to the bottom plate 22. The pivotable bearing journal 76 comprises an inner race 82 mounted to the bottom of the threaded rod 74, an outer race 84 surrounding the inner race 82 with a plurality of ball bearings 86 positioned therebetween. The outer race 84 is pivotably mounted through pins 90 to a housing 88 which in turn is secured to the bottom plate 22. Thus, a rod 74 rotates freely within the housing 88 about the longitudinal axis thereof and is further free to rotate slightly with respect to housing 88 on pins 90 to accommodate slight changes in the angle of the threaded rod 74 with respect to the bottom plate 72 as the plate 36 rotates about pins 40.

A microswitch 92 having an actuator 94 is mounted on the top of center plate 36 such that the actuator 94 extends beneath plate 80. In similar fashion a microswitch 96 having actuator 98 is mounted on top of the microswitch 92 such that the actuator 98 extends above the plate 80. The microswitches 92 and 96 provide a shutoff means for the motor which drives the threaded rod 74 so that the plate 36 rotates between predetermined limits on the pivot pins 40. Thus, when the plate 36 is raised by the threaded rod 74, it will strike the actuator 94 to shut off the drive to the threaded rod 74. In like manner, when the plate 36 is lowered with respect to the bottom plate 22, the plate 80 will strike the actuator 98, thereby actuating microswitch 96 to shut off the drive motor for the threaded rod 74.

A drive motor 100 is provided on the plate 36 to drive the threaded rod 74 through an output pulley wheel 102 and a pulley belt 104 which engages the gear wheel 78. Thus, driving the motor 100 in one direction will in turn drive the threaded rod 74 in one rotational direction to raise the plate 36 with respect to the bottom plate 22 about the pivot axis 40. Conversely, driving the motor 100 in an opposite direction will drive the threaded rod 74 in an opposite direction to lower the plate 36 with respect to the bottom plate 22 about the pivot axis 40.

Figure 7:
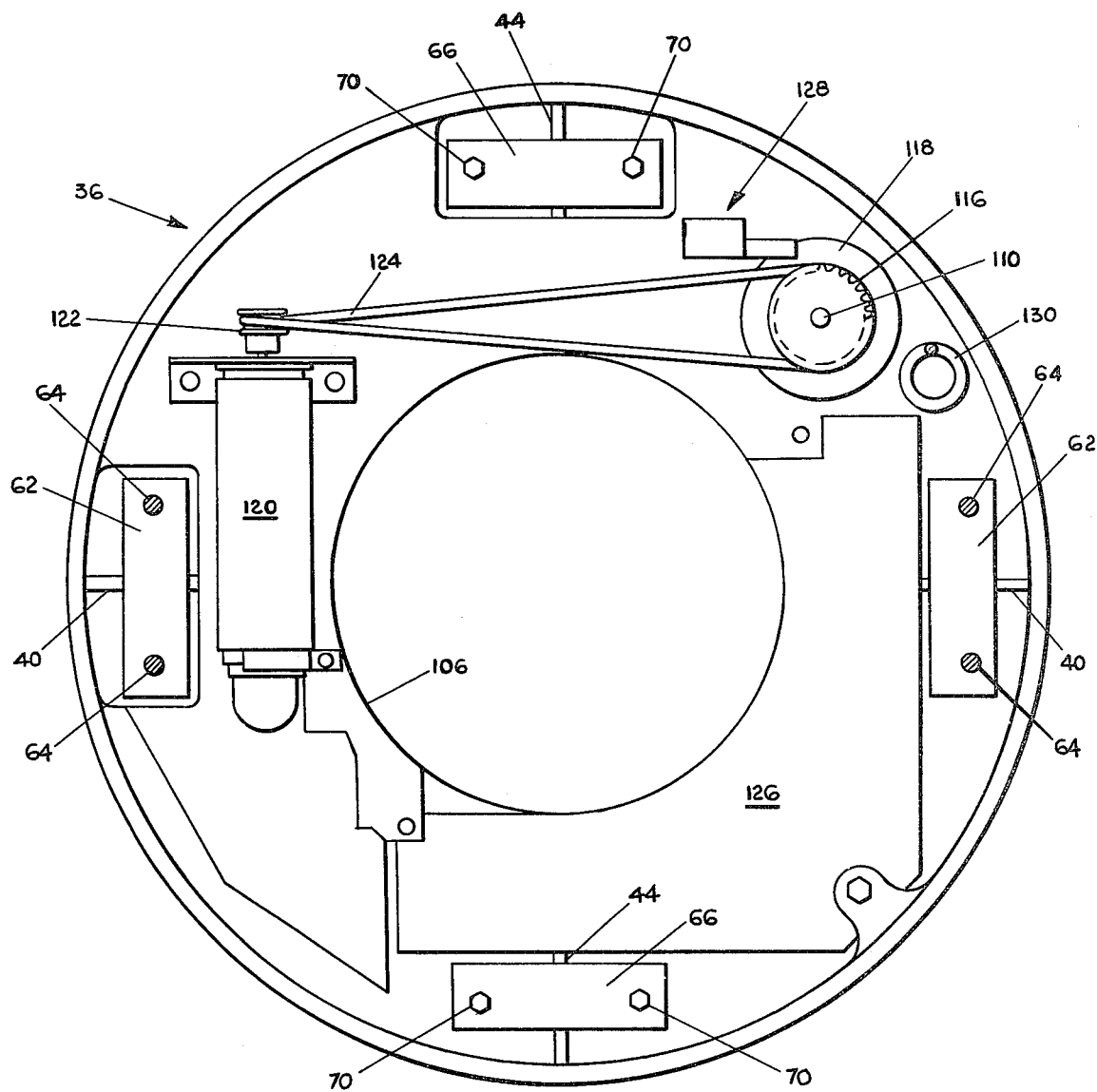
FIG. 7 is a view taken along lines 7—7 of FIG. 3.

A similar threaded rod mechanism is provided for adjusting the position of the central plate 36 with respect to the top plate 20 about the axis of the pins 44. Reference is now made to FIGS. 4, 5 and 7 for a description of this threaded rod drive system. A threaded rod 110 is threaded through a nut 114 mounted in central plate 36 and is mounted to the top plate 20 through a pivotably mounted bearing journal 112. The journal 112 is identical in construction with the journal 76 and for purposes of brevity will not be further described. A gear wheel 116 and a plate 118 are mounted to the bottom of the threaded rod 110 as seen in FIG. 7. A motor 120 is mounted to the undersurface of the central plate 36 and has an output pulley wheel 122 which drives the threaded rod 110 through a pulley belt 124 which is trained about the pulley wheel 122 and the gear wheel 116. Microswitch controls 128, identical in construction to the controls 92 and 96, control the motor 120 to limit the extent of rotation of the plate 36 with respect to the top plate 22 about the pivot pins 44. Thus, motor 120 drives the threaded rod 110 to control the position of the gimbaled central plate 36 with respect to the top of plate 20 about pivot axis 44.

Although the journal mounting 112 and the threaded nut 114 provide a rigid connection between the central plate 36 and the top of plate 20, a spring 132 (FIGS. 3 and 4) is provided to remove any lash between the threaded rod 110 and the connection therewith. The spring 128 extends between the top of plate 20 and the central plate 36 diametrically opposite the threaded rod 110. In like manner, a spring 130 is provided between the central plate 36 and the bottom plate 22 (see FIG. 7) and diametrically opposite the threaded rod 74 to bias the threaded rod drive system and avoid any lash between the threaded rod 74 and the connection thereof with plates 36 and 22.

As illustrated in FIG. 5, the central plate 36 has a central opening 106 and a printed circuit board 108 mounted thereon. The printed circuit 108 is triangular shaped and fits around the central opening 106. The printed circuit board 108 has a control system which is connected to an output from the first level vial 50 to control the motor 100.

In like manner, a printed circuit board 126 is mounted on the underside of plate 36 as seen in FIG. 7. The control circuit of the printed circuit board 126 is connected to the output from the second level vial 52 to control motor 120.

Figure 8:
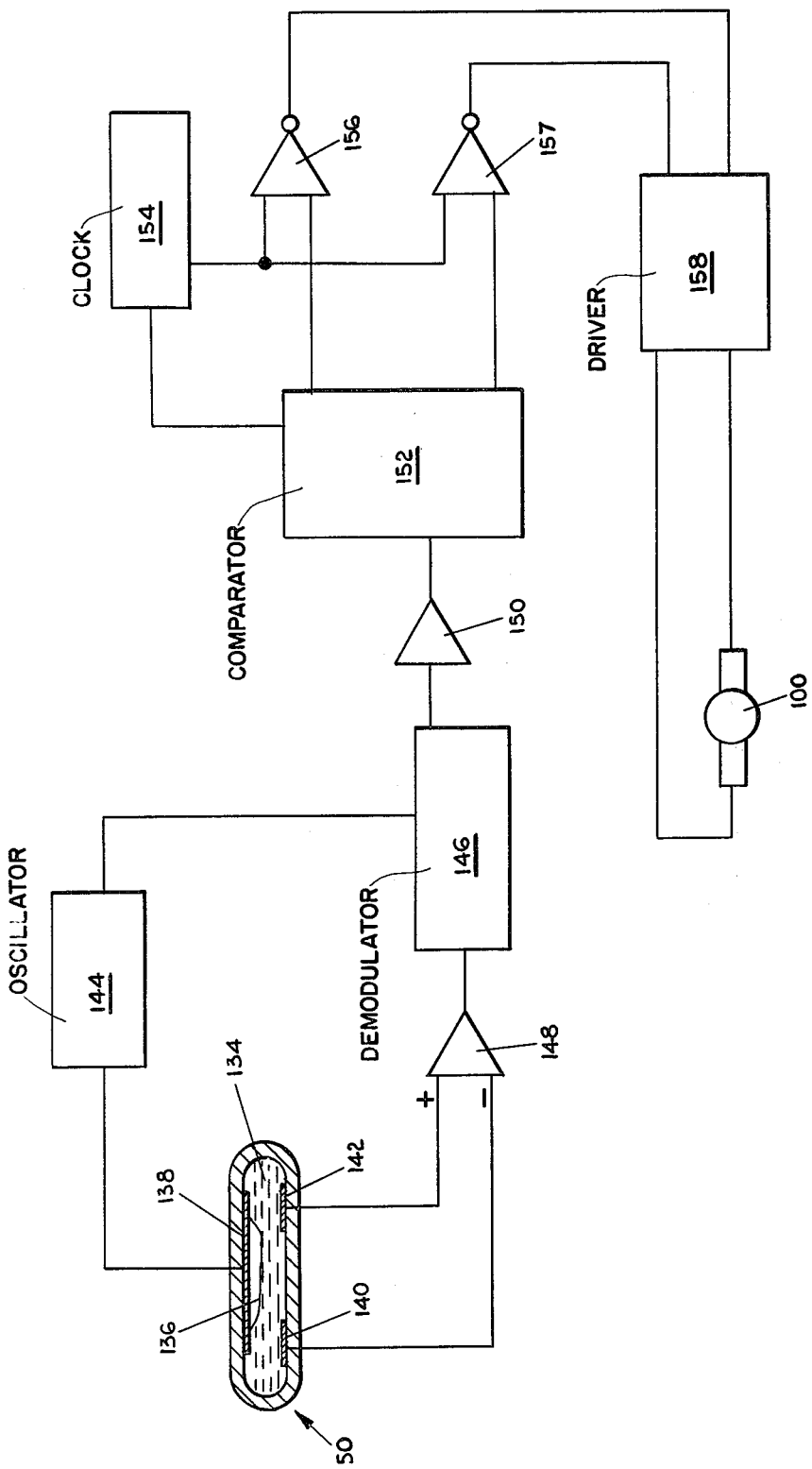
FIG. 8 is a schematic electrical diagram of a control system according to the invention for controlling the position of one of the pivot axes of the leveling platform.

The control circuit for controlling motor 100 from the position of the level vial 50 will now be described with reference to FIG. 8. It is understood that an identical circuit is provided between the second level vial 52 and the motor 120. For purposes of brevity, only the control circuit for motor 100 will be described.

The level vial 50 is filled with a liquid 134 with the exception of a small portion thereof which forms a bubble 136. To this extent, the level vial is conventional in nature. A top electrode 138 is mounted at the top of the level vial and bottom electrodes 140 and 142 are mounted at the bottom of the vial. The top electrode 138 extends to the outer ends of the bottom electrode 142 so that the capacitance between the top electrode 138 and each of the bottom electrodes 140 and 142 can be detected.

An oscillator 144 is coupled to the electrode 138 and to a demodulator 146. The output from electrodes 140 and 142 are applied to a differential amplifier 148, the output of which is applied to the demodulator 146. The oscillator 144 provides a source signal to the electrode 138 so that the capacitance can be measured between the electrode 138 and the bottom electrodes 140 and 142. Further, the oscillator 144 provides a reference signal to the demodulator 146 to compare the phase of the output signal of the amplifier 148 with the phase of the oscillator input signal to the electrode 138. When the bubble 136 moves to one side, for example, to the right as viewed in FIG. 8, the capacitance between the electrode 138 and 142 will be less than the capacitance between electrode 138 and 140. Accordingly, the output from electrode 142 will be less than the output from electrode 140. This difference is amplified in the differential amplifier 148 which generates an output signal representative of the capacitance difference between electrodes 140 and 142. This signal from amplifier 148 is applied to the demodulator 146. The output from the electrode 142 will be in phase with the oscillator signal and the demodulator will read this signal, for example, as a positive signal. The demodulator converts the AC signal into a DC signal representative of the capacitance sensed between electrode 138 and 142. This DC signal is applied to an amplifier 150 which amplifies the DC signal and applies the amplified signal to a comparator 152.

On the other hand, in the event that the bubble is moved to the left side of the vial so that the capacitance between the electrode 138 and 140 is less than the capacitance between electrode 138 and 142, a signal will likewise be applied to the demodulator 146. However, the operational amplifier 148 will shift the signal 180 degrees so that the signal is out of phase with the oscillator signal. In this case, the demodulator again converts the capacitance signal from the amplifier 148 to a DC output signal representative of the magnitude of the capacitance between electrodes 138 and 140 but the polarity of this signal will be negative. Thus, the output from the demodulator 146 is a signal which is representative of the right or left position of the bubble with respect to the electrodes 140 and 142 and further is a function of the degree to which the bubble 136 has moved to the right or to the left within the vial 50.

The comparator 152 compares the polarity and the magnitude of the input signals thereto and provides drive signals to NOR gate 156 or 157 responsive to the polarity of the input signal 152. The output from the NOR gates 156 and 157 is applied to a driver 158 which in turn drives the motor 100. A clock 154 is coupled to the comparator 152 and to the NOR gate 156 to provide pulses to the NOR gate 156 to drive the driver 158 in accordance with pulses from the clock.

The comparator 152 functions to detect the amplitude of the output signal from amplifier 150 and to apply an output signal to the NOR gate 156 or 157. Normally, when the input signal to the comparator is zero, there will be an output to each of the NOR gates 156 and 157. In the event that a positive signal is applied to the comparator 152, the output from the comparator to the NOR gate 156 is zero and there is an output signal to the NOR gate 157. If the amplitude of the signal applied to the comparator 152 is below a first predetermined value (greater than zero), then the clock will pulse at a first rate of, for example, every six seconds. The clock 154 is adapted to apply a continuous signal to the NOR gates 156 and 157 except during intervals controlled by the input thereto from comparitor 152. If the input signal to the comparator is below the first predetermined level, then a first signal will be applied to the clock 154 by the comparator 152 and the output signal from the clock 154 will be interrupted at a first rate, for example, every six seconds. In this manner, a NOR gate 156 will be turned on every six seconds to provide a pulse to the driver 158 to drive the motor 100 in first direction when the amplitude of the input signal to the first comparator is below a first predetermined level.

When the amplitude of the input signal to the comparator is above the first predetermined level, the comparator will apply a second control signal to the clock 154 and the clock 154 will pulse the output signal therefrom at a faster rate, for example, at about 400 milliseconds, so that a pulse is provided to the driver 158 every 400 millisenconds. Assuming a positive input to the comparator 152 above the first predetermined level, the driver 158 will be pulsed every 400 milliseconds by the output from the NOR gate 156 and, in turn, the motor will be pulsed every 400 milliseconds to drive in a first direction every 40 milliseconds.

When the input to the comparator is above a second predetermined level, then the comparator will apply a third control signal to the clock which, responsive thereto, will cut off the output therefrom so that no signal is applied to either of the NOR gates 156 and 157. Assuming a positive input to the comparator 152 above the second predetermined level, the signal to the NOR gates from the clock 154 will be zero and NOR gate 156 will apply a signal to driver 158 to drive the motor 100 in the first direction continuously so long as the amplitude of the signal to comparator 152 remains above the second predetermined level. When the level drops below the second predetermined level, the clock 154 will pulse the output signal therefrom at the faster rate to pulse the driver and motor at the faster rate. When the amplitude of the signal drops below the first predetermined level, the clock will drive at a lower rate to pulse the driver and motor at the slower rate.

In like manner, a negative input signal to the comparator 152 will interrupt the signal therefrom to the NOR gate 157 and an output signal will be provided from the NOR gate 157 in accordance with the amplitude of the input signal to the comparator 152. When the amplitude of a negative input signal to comparator 152 is below a first predetermined level greater than zero, the clock will pulse the NOR gate 157 at a slow rate so that there is an output signal from the NOR gate 157 to the driver 158 to drive the motor in a second direction. Similarly, when the input signal to the comparator 152 is negative and is above the first predetermined level and below a second predetermined level, the clock 154 will pulse the NOR gates 156 and 157 at a faster rate, thereby generating an output signal from NOR gate 157 to drive the driver 158 and motor 100 in a second direction at the second pulsed rate. When the negative input to the comparator 152 rises above the second predetermined level, the clock will be turned off and the driver 158 and motor 100 will be driven continuously in the second direction until the amplitude of the signal falls below the second predetermined level.

The motor 100 is connected so as to drive the screw 74 to return the bubble 136 to its central position. In other words, the motor 100 would be driven in such a manner to return the bubble 136 to its central position from any movement to the right or the left.

The invention thus provides an automatic leveling platform wherein the platform is gimbaled with respect to a base and the position of the platform with respect to a level condition is sensed by a pair of level vials. The capacitance of the level vials is detected and the platform is driven electronically to return the platform to a level condition. The invention provides a means for mounting laser generators and other devices in a level or vertical condition where such is necessary. Not only does the platform provide for an easier set-up for the laser or other such device but it also provides for a mechanism whereby the platform can be maintained in a level condition. This function is necessary in environments where changes in the sun position, wind or cloud position can alter the level condition of a tripod mounted device.

Whereas the invention has been described with reference to an apparatus for maintaining a first support means in a level condition, the invention can also be used to maintain the first support means in a given orientation with respect to the horizontal. To this end, one or both of the level vials can be pivotably mounted for graduated adjustment, for example, with a micrometer, so that the position of the level vial with respect to horizontal can be adjusted. In this manner, the device can be used for setting and maintaining a grade on the platform 20.

Further, the axes about which the platform 20 rotates need not be mutually perpendicular to each other although this system is preferred for purposes of simplicity. If the axes are not mutually perpendicular, more sophisticated electrical circuitry would be required to break down the capacitance signals into components and to drive the threaded rods accordingly.

Reasonable variation and modification are possible within the scope of the foregoing disclosure and drawings without departing from the spirit of the invention which is defined in the claims.

The embodiments of the invention in which an exclusive property or privelege is claimed are defined as follows:

1. An apparatus for orienting and maintaining laser equipment and the like in a predetermined relationship with respect to the horizontal, the apparatus comprising:
   a first support means to which a laser or other construction tool can be mounted;
   a second support means adapted to be mounted in a fixed position;
   third support means gimbaled in position between the first and second support means;
   means mounting the third support means to the first and second support means for rotation about first and second axes respectively;
   means mounted on the first support means for detecting the angular position of the first support means with respect to a horizontal plane and for generating an output signal representative of the direction and magnitude of angular deviation of the first support means with respect to the horizontal;
   servo means electrically coupled to the detecting means and mounted on the third support means for driving the first support means about the first and second axes with respect to the second support means and responsive to the output signal from the detecting means so as to null the output signal from the detecting means; and
   said servo means having means to continuously drive said first support means about said axes when the magnitude of said output signal is above a first predetermined value and to intermittently drive said first support means about said axes when the magnitude of the output signal is between zero and the first predetermined value.

2. An apparatus according to claim 1 wherein the first, second and third support means have a large central opening adapted to receive a laser generator housing therein.

3. An apparatus according to claim 1 wherein the detecting means comprises a first level vial mounted on the underside of the first support means perpendicular to the first axis and a second level vial mounted on the underside of the first support means perpendicular to the second axis.

4. An apparatus according to claim 3 wherein said signal generating means further comprise means coupled to the first level vial for generating a first control signal representative of the rotational position of the first vial about the first axis with respect to a horizontal plane, the first control signal being representative of the degree and direction of rotational position of the first vial with respect to the horizontal plane.

5. An apparatus according to claim 4 wherein the signal generating means further comprises means coupled to the second level vial for generating a second control signal representative of the rotational position of the second level vial about the second axis with respect to the horizontal plane, the second control signal being representative of the degree and direction of the rotational position of the second vial with respect to the horizontal plane.

6. An apparatus according to claim 5 wherein the first control signal has a polarity representative of the angular direction, if any, of the first vial about the first axis and an amplitude representative of the degree of deviation of the first vial about the first axis; the servo means further comprises comparator means for detecting the level of the amplitude of the first control signal and means for actuating the drive means to drive the first support means about the first axis.

7. An apparatus according to claim 6 wherein the second control signal has a polarity representative of the angular direction, if any, of the second vial about the second axis and an amplitude representative of the degree of deviation of the second vial about the second axis; the servo means comprises comparator means for detecting the level of amplitude of the second control signal and means for actuating the drive means to drive the first support means about the second axis.

8. An apparatus according to claim 7 wherein the servo means pulses the drive means at a first rate when the amplitude of the first control signal is between zero and a second predetermined value less than the first predetermined value, and said pulse means pulses said drive means at a second faster rate when the amplitude of the first control signal is between the second predetermined value and the first predetermined value.

9. An apparatus according to claim 8 wherein the servo means further comprises a threaded rod threadably engaging the third support means and extending to the first support means, a motor mounted on the third support means and having an output shaft, and means flexibly coupling the motor output shaft to the threaded rod to drive the threaded rod to rotate the third support means with respect to the first support means about the first pivot axis.

10. An apparatus according to claim 9 wherein the servo means and the detecting means include printed circuits which are mounted on the third support means.

11. An apparatus according to claim 10 wherein the first, second and third support means have a large central opening adapted to receive a laser generator housing therein and the second support means is in underlying relationship to the first support means.

12. An apparatus according to claim 4 wherein the first control signal has a polarity representative of the angular direction, if any, of the first vial about the first axis and an amplitude representative of the degree of deviation of the first vial about the first axis; and the servo means comprises comparator means for detecting the level of the amplutide of the first control signal, and means for actuating the drive means to drive the first support means about the first axis.

13. An apparatus according to claim 1 wherein the servo means includes printed circuits which are mounted onto the third support means.

14. An apparatus according to claim 1 wherein the servo means further comprise a threaded rod threadably engaging the third support means and extending to the first support means, a motor mounted on the third support means and having an output shaft, and means coupling the motor output shaft to the threaded rod to drive the threaded rod to rotate the third support means with respect to the first support means about the first axis.

15. An apparatus according to claim 1 wherein the first, second and third support means have a large central opening; and further comprising a laser generator apparatus mounted to the first support means and extending through the first, second and third support means; and a fourth support means attached to the second support means for mounting the second support means in a generally horizontal orientation above the floor or ground.

* * * * *